United States Patent [19]

Romberger et al.

[11] Patent Number: 4,931,318

[45] Date of Patent: Jun. 5, 1990

[54] SILICA AS BLOCKING AGENT FOR FIBERGLASS SIZING

[75] Inventors: John A. Romberger, Oak Park; Robert D. Jones; Richard P. Carr, both of Naperville, all of Ill.

[73] Assignee: Nalco Chemical Company, Naperville, Ill.

[21] Appl. No.: 248,221

[22] Filed: Sep. 23, 1988

[51] Int. Cl.$^5$ .............................................. B05D 3/02
[52] U.S. Cl. ............................... 427/397.7; 427/389.8
[58] Field of Search ........................... 427/389.8, 397.7

[56] References Cited

U.S. PATENT DOCUMENTS 4,367,248  1/1983  Ritter, II .............................. 427/307

Primary Examiner—Stanley Silverman
Attorney, Agent, or Firm—John S. Roberts, Jr.; Donald G. Epple

[57] ABSTRACT

Colloidal silica prevents the interaction of cationic softeners and water-soluble polymers which are present in the manufacture of fiberglass mats.

3 Claims, No Drawings

SILICA AS BLOCKING AGENT FOR FIBERGLASS SIZING

INTRODUCTION

The fiberglass mat industry uses 1¼″ fiberglass to make mats. This fiberglass is coated with a sizing that consists of an alkylsiloxane, polyvinyl alcohol, a bacteriocide, and an antistatic compound. The antistatic compound, usually cationic softener, is a large cationic molecule that imparts a positive charge to the fiber. When making fiberglass mat, the manufacturers put the fibers in a water system containing a long-chain anionic viscosity modifier, such as a water-soluble acrylic acid polymer. The viscosity modifier and the cationic softener can interact to cause a precipitate to form. The resulting precipitate can interfere with the mat manufacturing and stain the final product.

THE INVENTION

This invention uses colloidal silica to prevent the cationic softener from interfering with the viscosity modifier.

Specifically, the invention provides a method of preventing the interaction of cationic softeners coated upon the surfaces of glass fibers with anionic polymers contained in aqueous baths used in forming the glass fibers into mats which comprises treating the fiber with at least 1 part per million, of colloidal silica, expressed as $SiO_2$, in the form of an aqueous colloidal silica sol.

THE CATIONIC SOFTENERS

These materials are well known and are usually fatty amines and preferably their quaternary ammonium salts. Illustrative of such compounds would be stearyl trimethyl ammonium chloride. Similarly, fatty imidazolines and their quaternary ammonium salts may be employed.

THE VISCOSITY MODIFIERS

These polymers generically are nigh molecular weight, e.g. greater than 500,000 (weight average), anionically charged, water-soluble polymers. Preferred are the acrylic acid polymers which are copolymerized with between 10-80% by weight of acrylamide and have a molecular weight greater than 1,000,000.

THE AQUEOUS COLLOIDAL SILICA SOLS

These products are well known and are produced by the neutralization with demetalization or deionization and subsequent concentration of water glass. Typical commercial silica sols are those set forth below in Table 1. The products listed below are all commercially available from Nalco Chemical Company, One Nalco Center, Naperville, Ill. 60566-1024.

TABLE I

| Product | % Silica | Specific Gravity | Particle Size (nm) | pH |
|---|---|---|---|---|
| Nalcoag[1] 1115 | 15 | 1.100 | 4 | 10.4 |
| Nalcoag 1130 | 30 | 1.21 | 8 | 10.0 |
| Nalcoag 1030 | 30 | 1.20 | 13 | 10.2 |
| Nalcoag 1140 | 40 | 1.30 | 15 | 9.7 |
| Nalcoag 1050 | 50 | 1.39 | 20 | 9.0 |
| Nalcoag 1060 | 50 | 1.39 | 60 | 8.5 |
| Nalcoag 2329 | 40 | 1.30 | 80 | 8.4 |
| Nalcoag 2326 | 14.5 | 1.10 | 5 | 9.0 |
| Nalcoag 2327 | 40 | 1.29 | 20 | 9.3 |
| Nalcoag 1034A | 34 | 1.23 | 20 | 3.0 |

[1]Registered trademark of Nalco Chemical Company

The preferred particle size range used in this invention is between 3–20 nm, although larger particle sizes up to about 150 nm may be used. The sols preferably have an alkaline pH greater than 8, and preferably greater than 9.

The dosage of the colloidal silica expressed as $SiO_2$ should be at least 1 ppm. Generally it will be within the range of 5–50 PPM. They may be added to the fibers directly before they are placed in the aqueous bath with the viscosity modifier or they may be added to the bath.

EXAMPLE

One way of measuring the amount of cationic charge on a fiber is the Rubine Dye Test. This test consists of adding a solution of Pyrazol Fast Bordeaux 2BL dye to the fiber and then rinsing the fiber with water. If cationic charge is present, the dye combines with it and shows up as a ruby red color that cannot be rinsed from the fibers. The deeper the color, the more cationic charge is present. This test is widely used in the cosmetic industry to show how much hair conditioner remains in the hair after the product is used. See U.S. Pat. No. 3,769,398 which is incorporated herein by reference.

N-1115 blocked the cationic charge on glass fibers which contained Cationic Softener X, a product of Lyndal Chemical Company. This cationic softener is a mixture of fatty cationic softener and its alcohol. The dark red color of the untreated fiber shows a large amount of cationic charge is present on these fibers. The sample of fiber treated with 100 ppm of N-1115, however, showed almost no color. The lack of color shows that the silica has neutralized almost all of the cationic charge on the fibers. Silica can be used to prevent the cationic softener on the fibers from interfering with the anionic viscosity modifier.

Having thus described our invention, we claim:

1. A method of preventing the interaction of cationic softeners coated upon the surfaces of glass fibers with anionic polymers contained in aqueous baths used in forming the glass fibers into mats which comprises treating the fiber with at least 1 part per million, of colloidal silica, expressed as $SiO_2$, in the form of an aqueous colloidal silica sol.

2. The method of claim 1 where the silica in the aqueous colloidal silica sol has an average particle size between 3–20 nm and an alkaline pH greater than 8.

3. The method of claim 1 where the silica in the aqueous colloidal silica sol has an average particle size between 4–20 nm and a pH greater than 9.

* * * * *